United States Patent [19]

Makino et al.

[11] 4,182,813
[45] Jan. 8, 1980

[54] PROCESS FOR THE PREPARATION OF 1,2-POLYBUTADIENE

[75] Inventors: Kenya Makino, Kuwana; Koei Komatsu, Yokkaichi; Yasumasa Takeuchi; Masayuki Endo, both of Yokohama, all of Japan

[73] Assignee: Japan Synthetic Rubber Co., Ltd., Tokyo, Japan

[21] Appl. No.: 905,951

[22] Filed: May 15, 1978

[30] Foreign Application Priority Data

May 23, 1977 [JP] Japan ................................ 52-58725

[51] Int. Cl.² ............................................. C08F 4/80
[52] U.S. Cl. ................................ 526/92; 260/33.6 A; 428/220; 526/335
[58] Field of Search ........................................... 526/92

[56] References Cited

U.S. PATENT DOCUMENTS

| | | | |
|---|---|---|---|
| 3,498,963 | 3/1970 | Ichikawa et al. | 260/94.3 |
| 3,778,424 | 12/1973 | Sugiura et al. | 526/141 |

*Primary Examiner*—Stanford M. Levin
*Attorney, Agent, or Firm*—Oblon, Fisher, Spivak, McClelland & Maier

[57] ABSTRACT

A process for preparing crystalline 1,2-polybutadiene by contacting 1,3-butadiene with a catalyst consisting of (A) a cobalt compound, (B) an organoaluminum compound, (C) water in an amount of 0.25 to 1.5 mole per mol of said organoaluminum compound, and (D) an organic phosphorus compound in a halogenated hydrocarbon solvent to polymerize the butadiene, characterized in that as said organic phosphorus compound there is used a compound represented by the formula:

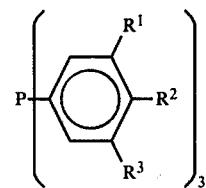

wherein $R^1$ is an alkyl or aryl group, and $R^2$ and $R^3$ represent independently hydrogen, or alkyl or aryl groups. This process can produce 1,2-polybutadiene having a degree of crystallization of 25 to 50% in a high yield at a temperature of from 0° to 30° C.

20 Claims, No Drawings

PROCESS FOR THE PREPARATION OF 1,2-POLYBUTADIENE

This invention relates to a process for the preparation of crystalline 1,2-polybutadiene by polymerizing 1,3-butadiene, and more particularly, to a process for preparing 1,2-polybutadiene with a controlled degree of crystallization, particularly within the range of 25 to 50%, by using a catalyst composed of a cobalt compound, an organoaluminum compound, an organic phosphorus compound and water.

There are known several types of catalysts which are capable of producing crystalline 1,2-polybutadiene. For instance, U.S. Pat. No. 3,498,963 discloses a process for producing a syndiotactic 1,2-polybutadiene by using a catalyst composed of a cobalt compound, an organoaluminum compound, water and an organic phosphorus compound, or a catalyst composed of a cobalt compound-organic phosphorus compound complex, an organoaluminum compound and water.

As a result of extensive research on crystalline 1,2-polybutadiene, the present inventors have found that the properties of 1,2-polybutadiene are greatly affected by the degree of crystallization and, particularly, a 1,2-polybutadiene with a degree of crystallization of 25 to 50%, especially 25 to 40%, is significantly higher in mechanical strength such as tensile strength than those having a degree of crystallization of less than 25% and is also higher in melting point, so that the molded products such as films from such 1,2-polybutadiene are wider in the range of use temperature and more excellent in solvent resistance. Such 1,2-polybutadiene is also more excellent in processability than those having a degree of crystallization exceeding 50%.

It is possible to produce a 1,2-polybutadiene having a degree of crystallization of around 25 to 50% according to the method of U.S. Pat. No. 3,498,963, but this method is not always industrially advantageous in respect of polymerization conditions because it needs to keep the polymerization temperature at less than 0° C. when, for instance, a 1,2-polybutadiene having a degree of crystallization of more than 30% is to be produced according to this method by using a catalyst composed of cobalt bisacetylacetonate, triphenylphosphine, triethylaluminum and water as used in Example 1 of said U.S. Patent.

There is also known a catalyst system composed of a soluble cobalt compound, an organoaluminum compound and carbon disulfide (U.S. Pat. No. 3,778,424) which is capable of producing a 1,2-polybutadiene with high crystallinity.

Further, Japanese Patent Application Kokai (Laid-Open) No. 121379/75 and No. 121380/75 disclose processes for preparing 1,2-polybutadienes with different melting points by using a catalyst composed of a cobalt compound, an organoaluminum compound, carbon disulfide and a ketone or an alcohol. However, for producing a 1,2-polybutadiene having a degree of crystallization of 25 to 50% according to these processes, it is necessary to add a large quantity of a ketone or an alcohol, resulting in excessively reduced polymerization activity.

The present inventors have made efforts for finding a process for producing in a high yield a 1,2-polybutadiene having a desired degree of crystallization, particularly a degree of crystallization of around 25 to 50% which has been difficult to prepare under commercially advantageous conditions with the prior art techniques, and as a result, it has been discovered that a surprisingly good result is obtained by use of a specific type of compound as the organic phosphorus compound in the process of U.S. Pat. No. 3,498,963.

An object of this invention is to provide a process for producing 1,2-polybutadiene with a desired degree of crystallization in a high yield.

Another object of this invention is to provide a process for preparing 1,2-polybutadiene having a degree of crystallization of 25 to 50% under the mild polymerization conditions.

Other objects and advantages of this invention will become apparent from the following description.

According to the present invention, there is provided a process for producing crystalline 1,2-polybutadiene by contacting 1,3-butadiene with a catalyst composed of (A) a cobalt compound, (B) an organoaluminum compound, (C) water in an amount of 0.25 to 1.5 mols per mol of said organoaluminum compound, and (D) an organic phosphorus compound in a halogenated hydrocarbon solvent to polymerize the butadiene, characterized in that as said organic phosphorus compound there is used a compound represented by the formula:

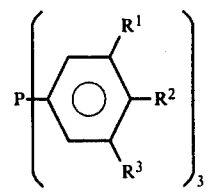

wherein $R^1$ is an alkyl or aryl group, and $R^2$ and $R^3$ represent independently hydrogen, or alkyl or aryl groups.

The process of this invention can produce 1,2-polybutadiene with any desired degree of crystallization not exceeding 50% in a high yield by using the same polymerization conditions as employed in the conventional methods except for use of a specific type of organic phosphorus compound and/or a change of the polymerization temperature. Further, according to the process of this invention, the treatment of the polymerization mixture is easy and it is possible to produce, with ease and in a high yield, 1,2-polybutadiene having a degree of crystallization of 25 to 50%, especially 25 to 40%, the production of which has been difficult with the conventional techniques, without requiring any particularly low temperature for the polymerization but by using a temperature of from 0° to 30° C., which temperature range is advantageous in industrial practice. Use of an organic phosphorus compound of the type specified in this invention leads to the advantageous production of 1,2-polybutadiene which is approximately 5 to 15% higher in degree of crystallization than those obtained by using, for example, triphenylphosphine as the organic phosphorus compound, by performing the polymerization under the same conditions. Also, the polymers obtained by the process of this invention retain excellent transparency and processability and are improved in properties such as strength, modulus of elasticity, etc.

1,2-Polybutadiene obtained according to this invention finds its practical application for a wide variety of uses either singly or in combination with other materials such as rubber or resin. The typical and recommended uses of this polymer are stretched films, shrinkable films, laminate films, various kinds of tubes and hoses, heat-fusible adhesives, various types of molded articles such as footwear and the like, photosensitive resin materials and the like.

The cobalt compound used as component (A) of the catalyst in the process of this invention may be selected from a wide variety of cobalt compounds having an apparent valence of from zero to the highest, and the following may be exemplified as preferred examples of such cobalt compounds: cobalt halide, cobalt sulfate, cobalt nitrate, cobalt carbonate, cobalt phosphate, cobalt hydroxide, cobalt cyanate, cobalt thiocyanate, cobalt naphthenate, cobalt octenoate, and complexes having as ligand a carbonyl, isonitrile, vinyl compound, cyclopentadienyl, $\pi$-ally or derivatives thereof, acetylacetone, acetoacetic acid, etc. As more specific examples of these compounds, there may be exemplified cobalt(II) bromide-triphenylphosphine complex, acetylacetone cobalt(II), cobalt octenoate, cobalt naphthenate, cobalt(II) chloride, cobalt(II) bromide, cobalt(II) iodide and complexes of these cobalt halides and pyridine, cobalt ethylxanthogenate, cobalt isopropylxanthogenate, cobalt butylxanthogenate, cobalt phenylxanthogenate, etc. Among these cobalt compounds for use in this invention, most preferable are acetylacetone cobalt-(II), cobalt naphthenate, cobalt(II) chloride and cobalt-(II) bromide.

The organoaluminum compound used as component (B) in the process of this invention is chosen from those represented by the general formula: $AlR_3$ (wherein R is an alkyl group). The alkyl group may be either of the straight chain type or of the branched chain type, but it is preferred that such an alkyl group has 1 to 6 carbon atoms. Preferred examples of the organoaluminum compounds are triethylaluminum, triisobutylaluminum, trihexylaluminum, and the like.

Component (D) used in the process of this invention is an organic phosphorus compound represented by the general formula:

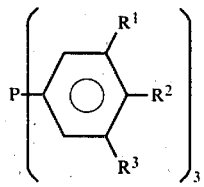

wherein $R^1$ is an alkyl or aryl group, and $R^2$ and $R^3$ represent independently hydrogen, or alkyl or aryl groups. Although no specific restriction is put on the number of carbon atoms in $R^1$, $R^2$ and $R^3$, it is preferred that the carbon number in any of these groups is within the range of 1 to 6. Examples of the organic phosphorus compounds usable in this invention include tri(3-methylphenyl)phosphine, tri(3-ethylphenyl)phosphine, tri(3,5-dimethylphenyl)phosphine, tri(3,4-dimethylphenyl)phosphine, tri(3-isopropylphenyl)phosphine, tri(3-t-butylphenyl)phosphine, tri(3,5-diethylphenyl)phosphine, tri(3-methyl-5-ethylphenyl)phosphine, tri(3-methyl-4-phenylphenyl)phosphine, tri(3-methyl-5-phenylphenyl)phosphine, tri(3-ethyl-5-phenylphenyl)phosphine, tri(3-phenylphenyl)phosphine, tri(3,4,5-trimethylphenyl)phosphine, etc. Among these compounds, most preferable are tri(3-methylphenyl)phosphine and tri(3,5-dimethylphenyl)phosphine. It is possible in this invention to use a complex which has been previously prepared from a cobalt compound and an organic phosphorus compound. In this case, there is no need of using any additional organic phosphorus compound.

Use of an organic phosphorus compound of the type specified in this invention, such as mentioned above, makes it possible to obtain 1,2-polybutadiene with higher crystallinity under the given polymerization conditions than when using a triphenylphosphine derivative having a substituent only at the para-position.

In connection with the organic phosphorus compounds specified for use in this invention, it is to be noted that when $R^2$ is an alkyl group or an aryl group, $R^3$ is also preferably an alkyl group or an aryl group. Also, it is more recommendable to use an organic phosphorus compound where $R^2$ is hydrogen than a compound where $R^2$ is an alkyl or aryl group, because the former results in production of 1,2-polybutadiene with higher crystallinity. In fact, use of the former compound allows advantageous production of 1,2-polybutadiene having a degree of crystallization of 25 to 50% at a polymerization temperature of 0° to 30° C.

The method of preparing the catalyst used in this invention is subject to no specific restriction, but it is desirable to prepare such a catalyst by mixing the catalyst components in a halogenated hydrocarbon solvent. One may prepare the catalyst by mixing the components before contacting it with butadiene, or it may be prepared by mixing the components in the presence of butadiene in a polymerization reactor. Although the temperature used for such catalyst preparation is not subject to any particular limitations, there is usually employed a temperature of from $-20°$ C. to 50° C.

The molar ratio of the cobalt compound to the organoaluminum compound is usually from 1/1 to 1/1,000, preferably from 1/5 to 1/100, but since the vinyl content and the degree of crystallization of the polymer obtained are not so much affected by said ratio, the mixing proportions of the respective components may be suitably selected depending on the polymerization activity and the desired molecular weight of the product.

The amount of water added as component (C) in the process of this invention is closely associated with the amount of organoaluminum compound added. It is important that water is added in an amount of 0.25 to 1.5 mols per mol of the organoaluminum compound. If the amount of water is less than 0.25 mols or more than 1.5 mols per mol of the organoaluminum compound, there results an excess reduction of the polymerization activity of the catalyst. The preferred amount of water is 0.5 to 1.0 mol per mol of the organoaluminum compound. The term "amount of water" as used above means the total amount of water present in the entire polymerization system.

The organic phosphorus compound, namely component (D) of the catalyst, is used in an amount of not less than 0.5 mols, usually 0.5 to 50 mols, preferably 1.0 to 10 mols, per mol of the cobalt compound. It is hard to obtain polybutadiene with a high 1,2-configuration content if the amount of the organic phosphorus compound added is less than 0.5 mols.

The polymerization reaction of this invention may be conducted either continuously or batchwise by contacting butadiene with the above-specified catalyst in a halogenated hydrocarbon solvent. The amount of the catalyst used in the polymerization reaction is usually about 0.001 to 1 mmol, preferably 0.01 to 0.5 mmol based on the amount of the cobalt compound per mol of the butadiene. The polymerization temperature is usually within the range of −50° to 100° C., preferably −20° to 80° C., most preferably 0° to 30° C. The degree of crystallization of the produced 1,2-polybutadiene may be varied depending on the polymerization temperature, and usually, the lower the polymerization temperature, the higher the crystallinity of the produced polymer, so that the polymerization temperature is properly selected according to the type of the organic phosphorus compound used and the desired degree of crystallization of the product. No particular limitation is placed on the pressure used for the polymerization; any pressure sufficient to maintain the reaction mixture substantially in liquid phase may be used.

The halogenated hydrocarbon solvent used for the polymerization reaction or for the catalyst preparation may be selected from halogenated hydrocarbons such as methylene chloride, chloroform, carbon tetrachloride, trichloroethylene, perchloroethylene, chlorobenzene, bromobenzene, chlorotoluene, etc. Most preferred is methylene chloride.

When the polymerization reaction has proceeded to a predetermined stage, to the reaction mixture is added a polymerization terminator such as an alcohol. The produced polymer is separated, washed and dried in the known manner to obtain the desired 1,2-polybutadiene. Additives such as antioxidant, thermal stabilizer, and the like may be added to said reaction mixture or the 1,2-polybutadiene.

The process of this invention will be described in further detail in the following Examples, but it should be understood that the Examples are not by way of limitation but by way of illustration.

In the following Examples and Comparative Examples, the microstructure of the polymers was determined from the infrared absorption spectra according to Morero's method, and the degree of crystallization of the polymers was measured according to the gradient density tube method by setting the density of the 1,2-polybutadiene with a degree of crystallization of 0% at 0.892 g/cm$^3$ and the density of the 1,2-polybutadiene having a degree of crystallization of 100% at 0.963 g/cm$^3$. The intrinsic viscosity ($\eta$) was measured at 30° C. by using toluene as solvent.

EXAMPLES 1–4

Into a 1-liter separable flask provided with a stirrer, a thermometer and a nitrogen inlet tube were charged 556 ml of methylene chloride, 48 g of 1,3-butadiene, 2.65 ml (0.0265 mmol) of a 0.01 mol/liter methylene chloride solution of cobalt bisacetylacetonate (Co(acac)$_2$), 5.3 ml (0.053 mmol) of a 0.01 mol/liter methylene chloride solution of an organic phosphorus compound as shown in Table 1, 3.35 ml (0.67 mmol) of a 0.2 mol/liter methylene chloride solution of triisobutylaluminum and 0.335 mmol of water (using methylene chloride containing 1,000 ppm of water) in this order under a nitrogen gas atmosphere at 10° C., and the polymerization reaction was carried out under agitation at 10° C. for one hour. After the completion of the polymerization reaction, the polymerization was stopped by adding a small quantity of methanol containing an antioxidant, and then the reaction product was poured into a large quantity of methanol-hydrochloric acid solution containing an antioxidant to coagulate and precipitate the resulting polymer, and the latter was then dried under reduced pressure at room temperature. The results are shown in Table 1.

COMPARATIVE EXAMPLES 1–7

The procedure of Example 1 was repeated, except that the organic phosphorus compounds shown in Comparative Examples in Table 1 were used, to obtain the results shown in Table 1.

Table 1

|  |  | Organic phosphorus compound | Polymer yield (g) | Microstructure 1,2-content (%) | Degree of crystallization (%) | ($\eta$) (dl/g) |
|---|---|---|---|---|---|---|
| Example | 1 | Tri(3-methylphenyl)phosphine | 22 | 93 | 31 | 2.58 |
|  | 2 | Tri(3,4-dimethylphenyl)phosphine | 20 | 93 | 29 | 2.83 |
|  | 3 | Tri(3,5-dimethylphenyl)phosphine | 18 | 94 | 34 | 3.79 |
|  | 4 | Tri(3,4,5-trimethylphenyl)phosphine | 17 | 94 | 33 | 3.81 |
| Comparative Example | 1 | Triphenylphosphine | 21 | 90 | 23 | 2.03 |
|  | 2 | Tri(4-methylphenyl)phosphine | 21 | 89 | 21 | 2.14 |
|  | 3 | Tri(2-methylphenyl)phosphine | 5 | —* | — | — |
|  | 4 | Tri(2,3-dimethylphenyl)phosphine | 4 | —* | — | — |
|  | 5 | Tri(2,4-dimethylphenyl)phosphine | 6 | —* | — | — |
|  | 6 | Tri(2,3,4-trimethylphenyl)phosphine | 5 | —* | — | — |
|  | 7 | Tri(2,3,5-trimethylphenyl)phosphine | 7 | —* | — | — |

*Cis 1,4-polybutadiene

EXAMPLES 5–9

Into a 1-liter separable flask provided with a stirrer, a thermometer and a nitrogen inlet tube were charged 556 ml of methylene chloride, 0.335 mmol of water (using methylene chloride containing 1,000 ppm of water), 48 g of 1,3-butadiene, 3.35 ml (0.67 mmol) of a 0.2 mol/liter methylene chloride solution of triisobutylaluminum and 2.65 ml (0.0265 mmol) of a 0.01 mol/liter methylene chloride solution of a cobalt bromide-phosphine complex (complex CoBr$_2$L$_2$ shown in Table 2) in this order under a nitrogen gas atmosphere at 10° C. (Examples 5 to 7) or at 0° C. (Examples 8 and 9), and the polymerization was performed at 10° C. (Examples 5 to 7) or at 0° C. (Examples 8 and 9) for 45 minutes. After the completion of the polymerization reaction, the reaction product was treated in the same manner as in Example 1 to obtain the results shown in Table 2.

COMPARATIVE EXAMPLES 8 AND 9

Polymerization was carried out by following the same procedure as in Example 5 or 8, except that a triphenylphosphine complex of cobalt bromide was substituted for the tri(3-methylphenyl)phosphine complex of cobalt bromide, to obtain the results shown in Table 2.

complex of cobalt bromide. The results obtained are shown in Table 3.

Table 2

| | L compound of CoBr$_2$L$_2$ complex | Polymerization temp. (°C.) | Polymer yield (g) | Degree of crystallization (%) | ($\eta$) (dl/g) | 1,2-content (%) |
|---|---|---|---|---|---|---|
| Comparative Example 8 | Triphenylphosphine | 10 | 15.8 | 24 | 2.68 | 93 |
| Example 5 | Tri(3-methylphenyl)-phosphine | 10 | 21.6 | 31 | 3.57 | 94 |
| " 6 | Tri(3,5-dimethylphenyl)-phosphine | 10 | 18.7 | 34 | 4.63 | 95 |
| " 7 | Tri(3-phenylphenyl)-phosphine | 10 | 17.2 | 29 | 3.25 | 94 |
| Comparative Example 9 | Triphenylphosphine | 0 | 16.3 | 27.5 | 3.54 | 94 |
| Example 8 | Tri(3-methylphenyl)-phosphine | 0 | 17.3 | 34 | 4.36 | 95 |
| " 9 | Tri(3,5-dimethylphenyl)-phosphine | 0 | 9.6 | 37 | 4.06 | 96 |

Table 3

| | Co complex (mmol) | Al/Co molar ratio | Polymerization temp. (°C.) | Polymer yield (g) | Degree of crystallization (%) | ($\eta$) (dl/g) | 1,2-content (%) |
|---|---|---|---|---|---|---|---|
| Example 10 | 0.046 | 11 | 10 | 16.6 | 34.8 | 1.42 | 95 |
| Example 11 | 0.034 | 15 | 10 | 15.6 | 35.6 | 1.70 | 95 |
| Example 12 | 0.046 | 11 | 0 | 16.8 | 38.4 | 1.78 | 97 |
| Example 13 | 0.034 | 15 | 0 | 15.4 | 37.3 | 2.33 | 96 |
| Comparative Example 10 | 0.046 | 11 | 10 | 16.1 | 24.5 | 1.20 | 91 |
| Example 11 | 0.046 | 11 | 0 | 17.2 | 27.0 | 1.22 | 92 |
| Example 14 | 0.046 | 11 | 10 | 23.0 | 31.3 | 1.30 | 94 |
| Example 15 | 0.046 | 11 | 16 | 21.8 | 26.2 | 1.15 | 93 |
| Example 16 | 0.046 | 11 | −10 | 14.5 | 42.0 | 2.24 | 98 |

EXAMPLES 10–13

In a 300-ml separable flask having a stirrer, a thermometer and a nitrogen inlet was placed 215 ml of methylene chloride under a nitrogen gas atmosphere at 10° C. (Examples 10 and 11) or at 0° C. (Examples 12 and 13), followed by further addition of 0.252 mmol of water (using methylene chloride containing 1,000 ppm of water), 20 g of 1,3-butadiene, 2.52 ml (0.0504 mmol) of a 0.2 mol/liter methylene chloride solution of triisobutylaluminum and a determined quantity of a 0.01 mol/liter methylene chloride solution of a tri(3,5-dimethylphenyl)phosphine complex of cobalt bromide in this order, and the resulting mixture was subjected to polymerization at 10° C. (Examples 10 and 11) or at 0° C. (Examples 12 and 13) for one hour. After the completion of the polymerization reaction, the reaction product was treated in the same manner as in Example 1 to obtain the results shown in Table 3.

EXAMPLES 14–16

The procedure of Example 10 was repeated, except that the cobalt complex was replaced by a tri(3-methylphenyl)phosphine complex (Examples 14 and 15) or a tri(3,5-dimethylphenyl)phosphine complex (Example 16) of cobalt bromide and the polymerization temperature was varied, to obtain the results shown in Table 3.

COMPARATIVE EXAMPLES 10 AND 11

Polymerization was carried out by following the same procedure as in Example 10 or 12, except that a triphenylphosphine complex of cobalt bromide was substituted for the tri(3,5-dimethylphenyl)phosphine complex of cobalt bromide.

EXAMPLE 17

Into a 1-liter separable flask were charged 556 ml of methylene chloride, 0.606 mmol of water (using methylene chloride containing 1,000 ppm of water) and 50 g of 1,3-butadiene under a nitrogen gas atmosphere, and the temperature of the system was adjusted to 5° C. To this system were then added 5.05 ml (1.01 mmol) of a 0.2 mol/liter methylene chloride solution of triisobutylaluminum and 9 ml (0.09 mmol) of a 0.01 mol/liter methylene chloride solution of a tri(3,5-dimethylphenyl)phosphine complex of cobalt bromide, and the resulting mixture was subjected to polymerization under agitation at 5° C. for 90 minutes. The reaction product was treated in the same manner as in Example 1.

The yield of the polymer obtained was 46 g (92%) and [$\eta$] as measured at 30° C. in toluene was 1.58 dl/g. The degree of crystallization was 36% and the 1,2-content was 95%.

EXAMPLE 18

Into a 1-liter separable flask were charged 780 ml of methylene chloride, 0.655 mmol of water (using methylene chloride containing 1,000 ppm of water) and 65 g of 1,3-butadiene under a nitrogen gas atmosphere, and the temperature of this system was adjusted to 5° C. To this system were then added 6.55 ml (1.31 mmol) of a 0.2 mol/liter methylene chloride solution of triisobutylaluminum and 11.0 ml (0.11 mmol) of a 0.01 mol/liter methylene chloride solution of a tri(3-methylphenyl)phosphine complex of cobalt bromide, and the mixture was subjected to polymerization at 5° C. for 120 minutes. After the completion of the polymerization reaction, the product was treated in the same manner as in Example 1.

There was consequently obtained 56 g of a polymer (yield: 86%), and [η] as measured at 30° C. in toluene was 1.43 dl/g. The degree of crystallization and 1,2-content were 33% and 94%, respectively.

EXAMPLES 19 AND 20

The same procedure as in Example 5 was repeated except that triethylaluminum (Example 19) or trihexylaluminum (Example 20) was substituted for the triisobutylaluminum, to obtain the results shown in Table 4.

COMPARATIVE EXAMPLES 12 AND 13

The same procedure as in Comparative Example 8, except that triethylaluminum (Comparative Example 12) or trihexylaluminum (Comparative Example 13) was substituted for the triisobutylaluminum, to obtain the results shown in Table 4.

Table 4

|  | L compound of $CoBr_2L_2$ complex | Organic Al compd. | Polym. temp. (°C.) | Polymer yield (g) | Degree of crystallization (%) | (η) (dl/g) | 1,2-content (%) |
|---|---|---|---|---|---|---|---|
| Example 19 | Tri(3-methylphenyl)-phosphine | Triethyl-aluminum | 10 | 22.0 | 31 | 3.60 | 94 |
| Comp. Example 12 | Triphenylphosophine | " | " | 16.1 | 24 | 2.70 | 93 |
| Example 20 | Tri(3-methylphenyl) phosphine | Trihexyl-aluminum | " | 19.5 | 31 | 3.58 | 94 |
| Comp. Example 13 | Triphenylphosphine | " | " | 16.0 | 24 | 2.59 | 93 |

EXAMPLES 21 AND 22

The same procedure as in Example 5, except that chlorobenzene (Example 21) or perchloroethylene was substituted for the methylene chloride, to obtain the results shown in Table 5.

COMPARATIVE EXAMPLES 14 AND 15

The same procedure as in Comparative Example 8, except that chlorobenzene (Comparative Example 14) or perchloroethylene (Comparative Example 15) was substituted for the methylene chloride, to obtain the results shown in Table 5.

Table 5

|  | L compound of $CoBr_2L_2$ complex | Solvent | Polym. temp. (°C.) | Polymer yield (g) | Degree of crystallizaton (%) | (η) (dl/g) | 1,2-content (%) |
|---|---|---|---|---|---|---|---|
| Example 21 | Tri(3-methylphenyl)-phosphine | Chlorobenzene | 10 | 21.3 | 29 | 3.56 | 94 |
| Comp. Example 14 | Triphenylphosphine | " | " | 15.9 | 22 | 2.66 | 93 |
| Example 22 | Tri(3-methylphenyl)-phosphine | Perchloroethylene | " | 20.2 | 31 | 3.50 | 94 |
| Comp. Example 15 | Triphenylphosphine | " | " | 15.0 | 24 | 2.60 | 93 |

EXAMPLE 23

The 1,2-polybutadienes obtained in Examples 10 and 14 and Comparative Example 10 were subjected to heat compression for 5 minutes at a temperature of 150° to 200° C. and under a pressure of 100 to 300 kg/cm² to obtain 0.5 mm thick sheets, and their tensile strength and elongation at break were measured.

The measurement was made on said 1,2-polybutadiene sheets with a size of 0.5 mm×5.0 mm×100 mm at a drawing speed of 500 mm/min at a temperature of 25° C. The results obtained are shown in Table 6.

Table 6

| Items Specimen | Example 14 | Example 10 | Comparative Example 10 |
|---|---|---|---|
| [η] at 30° C. in toluene (dl/g) | 1.30 | 1.42 | 1.20 |
| Degree of crystallization (%) | 31.3 | 34.8 | 24.5 |
| 100% Tensile stress (kg/cm²) | 89 | 102 | 54 |
| Strength at break (kg/cm²) | 171 | 205 | 101 |
| Elongation at break (%) | 690 | 680 | 690 |

What is claimed is:

1. A process for producing crystalline 1,2-polybutadiene by contacting 1,3-butadiene with a catalyst composed of (A) a cobalt compound, (B) an organoaluminum compound, (C) water in an amount of 0.25 to 1.5 mols per mol of said organoaluminum compound, and (D) an organic phosphorus compound in a halogenated hydrocarbon solvent to polymerize the butadiene, characterized in that as said organic phosphorus compound there is used a compound represented by the general formula:

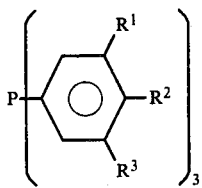

wherein $R^1$ is an alkyl or aryl group, and $R^2$ and $R^3$ represent independently hydrogen or alkyl or aryl groups.

2. The process according to claim 1, wherein $R^1$, $R^2$ and $R^3$ in the general formula are alkyl or aryl groups.

3. The process according to claim 2, wherein $R^1$, $R^2$ and $R^3$ are alkyl groups having 1 to 6 carbon atoms.

4. The process according to claim 1, wherein $R^2$ in the general formula is hydrogen.

5. The process according to claim 4, wherein $R^1$ and $R^3$ in the general formula are alkyl groups.

6. The process according to claim 5, wherein the alkyl group has 1 to 6 carbon atoms.

7. The process according to claim 1, wherein $R^1$ in the general formula is an alkyl group and $R^2$ and $R^3$ are hydrogen.

8. The process according to claim 7, wherein the alkyl group has 1 to 6 carbon atoms.

9. The process according to claim 1, wherein $R^1$ in the general formula is an aryl group and $R^2$ and $R^3$ are hydrogen.

10. The process according to claim 9, wherein the aryl group is phenyl.

11. The process according to claim 1, wherein the organic phosphorus compound is selected from the group consisting of tri(3-methylphenyl)phosphine, tri(3-ethylphenyl)phosphine, tri(3-isopropylphenyl)phosphine, tri(3-t-butylphenyl)phosphine, tri(3-phenylphenyl)phosphine, tri(3,5-dimethylphenyl)phosphine, tri(3,5-diethylphenyl)phosphine, tri(3,4-dimethylphenyl)phosphine, tri(3-methyl-5-ethylphenyl)phosphine, tri(3,4,5-trimethylphenyl)phosphine, tri(3-methyl-4-phenylphenyl)phosphine, tri(3-methyl-5-phenylphenyl)phosphine and tri(3-ethyl-5-phenylphenyl)phosphine.

12. The process according to claim 1, wherein the organic phosphorus compound is tri(3-methylphenyl)phosphine or tri(3,5-dimethylphenyl)phosphine.

13. The process according to claim 11, wherein the organic phosphorus compound is in the form of a complex with a cobalt compound.

14. The process according to claim 13, wherein the complex is a cobalt bromide-tri(3-methylphenyl)phosphine complex, a cobalt bromide-tri(3-phenylphenyl)phosphine complex, or a cobalt bromide-tri(3,5-dimethylphenyl)phosphine complex.

15. The process according to claim 1, wherein the polymerization temperature is within the range of $-50°$ to $100°$ C.

16. The process according to claim 1, wherein the polymerization temperature is within the range of $0°$ to $30°$ C.

17. The process according to claim 16, wherein a 1,2-polybutadiene with a degree of crystallization of 25 to 50% is produced.

18. The process according to claim 1, 15 or 16, wherein the amount of the organic phosphorus compound is more than 0.5 mols per mol of the cobalt compound.

19. The process according to claim 18, wherein the amount of the organic phosphorus compound is 0.5 to 50 mols per mol of the cobalt compound.

20. The process according to claim 19, wherein the amount of the catalyst used is 0.001 to 1 mmol in terms of the cobalt compound per mol of 1,3-butadiene.

* * * * *

UNITED STATES PATENT AND TRADEMARK OFFICE
CERTIFICATE OF CORRECTION

PATENT NO. : 4,182,813
DATED : January 8, 1980
INVENTOR(S) : Kenya Makino et al.

It is certified that error appears in the above-identified patent and that said Letters Patent are hereby corrected as shown below:

Column 7, line 44, please delete "(0.0504 mmol)" and replace therefor --(0.504 mmol)--.

Signed and Sealed this

Third Day of June 1980

[SEAL]

Attest:

SIDNEY A. DIAMOND

*Attesting Officer*  *Commissioner of Patents and Trademarks*